United States Patent Office 2,985,214
Patented May 23, 1961

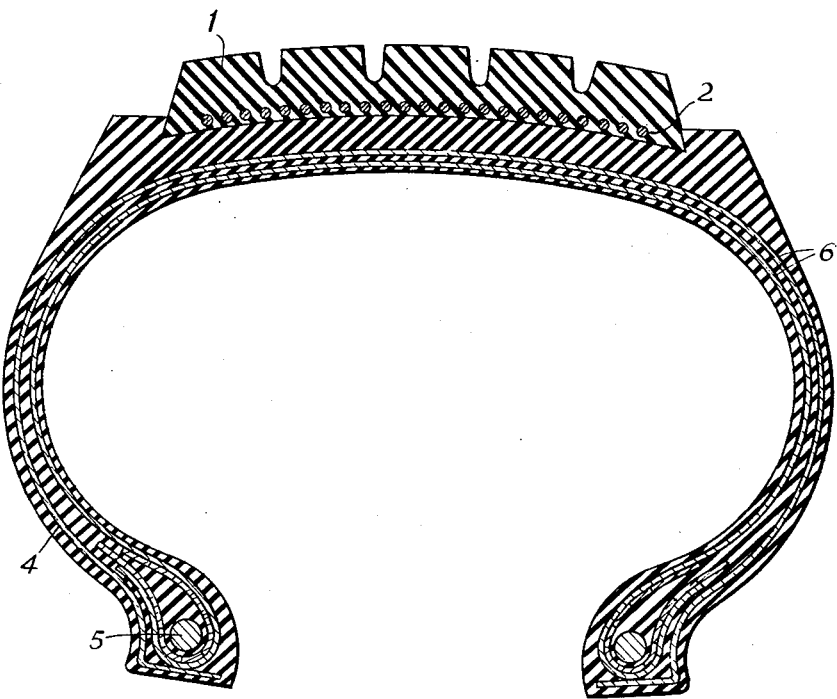

2,985,214
PNEUMATIC TIRES

Giuseppe Lugli, Milan, Italy, assignor to Pirelli Societa per Azioni, Milan, Italy, a company of Italy Filed Aug. 25, 1958, Ser. No. 757,030

Claims priority, application Italy Sept. 18, 1957

3 Claims. (Cl. 152—176)

This invention relates to pneumatic tires, and relates particularly to a pneumatic tire having a replaceable tread.

It is an object of this invention to provide a tread unit of simple and economical construction permitting of variation in the properties of the tread unit to meet the requirements of the tire.

According to this invention there is provided a removable tread pneumatic tire comprising in combination a casing unit which is substantially extensible peripherally of the tire but inextensible transversely of the tire, a removable separate tread unit, a tread layer forming part of said tread unit, a cincture for said casing unit forming the remainder of said tread unit, and a single reinforcing layer within said cincture causing the same to be substantially inextensible in a circumferential direction, radially deformable, and non-rigid in directions parallel and in directions transverse to the plane of the tire.

The reinforcing layer may be constituted by a plurality of reinforcing cords disposed peripherally or substantially peripherally of the tire. The cords are preferably disposed in a simple helix extending substantially across the width of the cincture, the coils of the helix forming angles lower than 5° with the plane of the tire; the coils are generally of the same diameter.

Figure 1:
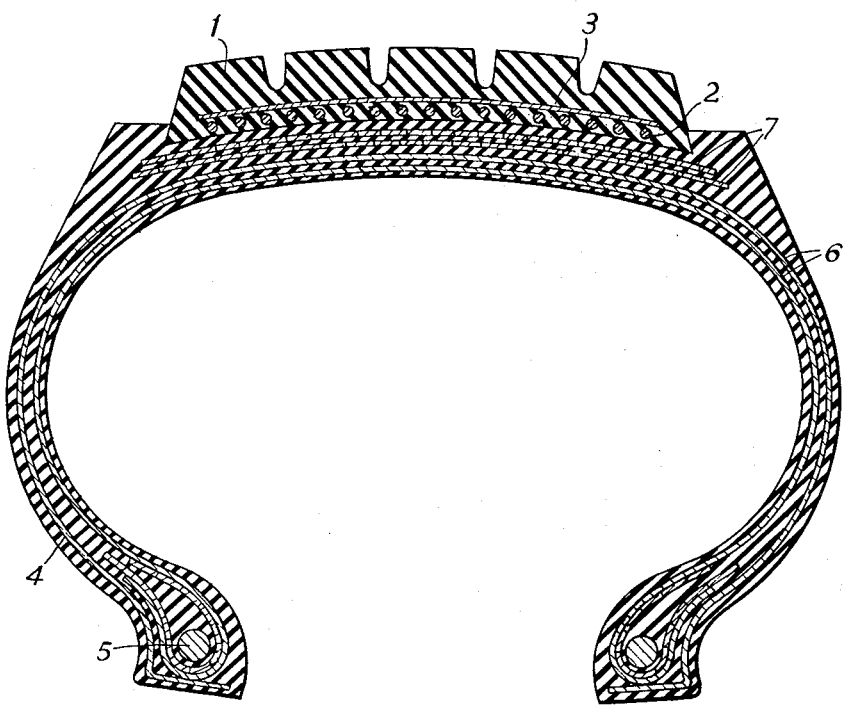
Figure 2:
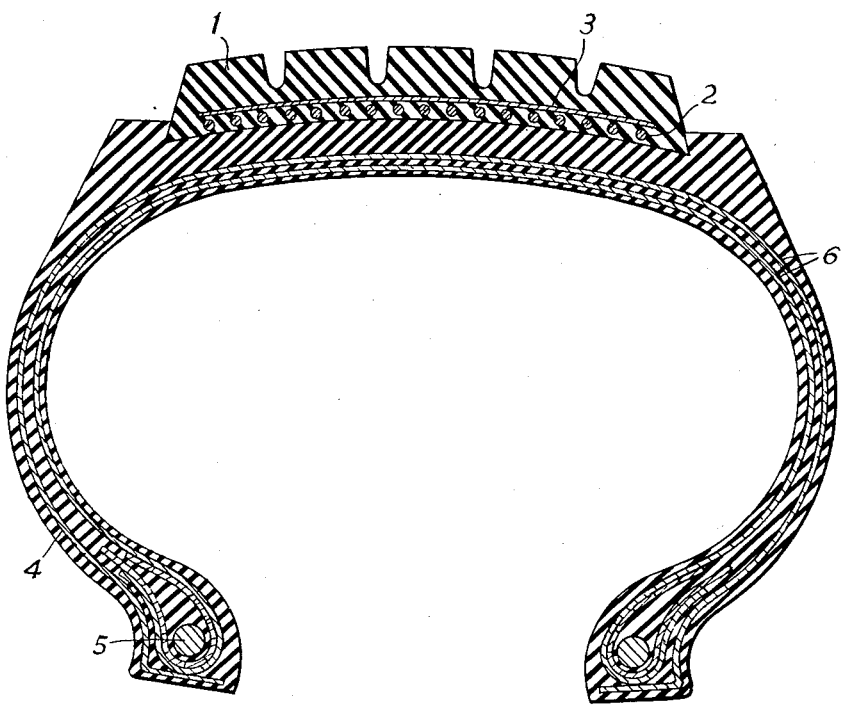

The invention will be described with reference to the accompanying drawings in which Figures 1 to 3 are diagrammatic transverse sectional elevations of three constructional forms of a replaceable tread tire constructed in accordance with the invention.

Referring first to Figure 1 a ring-shaped substantially cylindrical tread unit 1 comprises an armouring 2 constituted by a layer of metallic wire wound as an open helix with the planes of its coils disposed in directions substantially parallel to the plane of the tire, and a layer 3 of radially disposed metallic wires.

A casing unit 4 adapted to receive the tread unit 1, is provided with bead wires 5 and is shaped in such manner that the upper portion thereof forms a substantially cylindrical seating for the tread unit 1. The casing unit comprises two plies 6 each formed of a layer of textile and/or metallic cords disposed in a substantially radial direction, and a breaker structure 7 formed of two layers of metallic wires or cords arranged parallel to one another in each layer, the wires or cords of the two layers being crossed and lying in symmetrical directions with respect to the mid-circumferential plane of the tire. The wires or cords of the two layers may be disposed at any desired angles to the latter plane from 40° to 80°.

In the constructional form of tire illustrated in the accompanying drawing, the two layers of the breaker structure are slightly wider than the width of the seating for the tread unit in the casing unit, and the lower of the two layers is slightly wider than the upper layer.

It will be understood that the breaker structure 7 can be omitted. This form of construction is illustrated by Figure 2. Similarly, the layer 3 in the tread unit need not of necessity be employed.

Figure 3 illustrates a construction in which both the breaker structure 7 and the layer 3 in the tread unit are omitted.

As the tread unit 1 is a removable unit it is constructed and vulcanised or polymerised separately from the casing unit 4, and such being the case, it is possible to employ compounds in the manufacture of the two components which are vulcanised or polymerised under different heat treatments and with different technological processes which may even be inconsistent with one another. Thus, for instance, natural rubber may be employed in the manufacture of the carcass and polyurethane material in the manufacture of the tread unit in accordance with the disclosure and claims of United States patent application No. 568,789 of March 1, 1956, and now abandoned.

The material of the reinforcing armour of the cincture is preferably metallic cord. The number and the diameters of the wires forming this cord, and the number of coils forming the armouring layer depend upon the type and size of the tire required and the inflation pressure of the required tire service which may vary depending on the desired loads and speeds. It should be understood that the armouring of the simplified tread unit has the function of rendering the latter unit substantially inextensible in order to oppose the inflation pressure of the casing unit, and to withstand the centrifugal forces derived from the rotation of the tire.

This simplified construction of the tread unit obviates the necessity of shaping the tread in a curing bag. Thus, the tread can be shaped by outside concentric moulding or by injection of the compound, for instance by transfer moulding, or by pouring, as for example in the case of polyurethane material; any of these expedients offers considerable economic advantages. It will be understood, that in this process the outer surface of the tread unit, which is to contact the road surface, can be provided with grooves and ridges forming any desired pattern in the same way as is customary with conventional tire treads.

When cincture reinforcing cords of a relatively large diameter are employed and adjacent coils of the armouring are spaced a considerable distance apart, it is generally found advisable to place over the reinforcing layer one or more further layers of metallic wires or cords disposed in a substantially radial direction, namely perpendicularly to the direction of the coils, and so as to bear transversely against the latter and thereby obviate the formation of cracks in the bottoms of the grooves which normally form on the inner face of the tread ring in the spaces between the coils of the armouring. These layers of radial metallic wires or cords situated over the armouring also give considerable protection against puncturing and tearing.

The casing unit on which the tread unit is to be assembled, may in general be formed of one or more layers of radially disposed cords. However, in certain cases, for example in large size tires, or in tires suitable for heavy loads and/or high speeds, it may be advisable to reinforce the casing unit by a breaker structure composed of two or more layers of textile and/or metallic threads or cords parallel to one another in each layer. These threads or cords are, in general, disposed in directions which cross one another but which lie symmetrically to the mid-circumferential plane of the tire. The angle which the threads or cords make with the mid-circumferential plane of the tire may vary between 40° and 80°.

In general the threads of this breaker structure will be sheer threads as in the conventional breakers. The angles formed by the threads or cords and their thicknesses will depend upon the types of tires and their required service conditions. It is to be borne in mind that the breaker structure is intended to co-operate with the armouring of the tread unit in withstanding longitudinal stresses. Consequently, the armouring may be of smaller cross-section for resisting such stresses than in the case where the breaker is not employed, and the addition of the breaker therefore enables a cheaper tread unit to be employed.

On the other hand, the action of the breaker structure does not interfere to any substantial degree with the required grip of the tread unit on the casing unit. This grip is due to the inflation pressure of the casing unit bearing upon the inexpansible tread unit. As the tires in question must work at a considerable inflation pressure, it is found in practice, that the large angles and low thicknesses of the threads or cords allow a sufficient expansion of the casing unit for the tread unit to be securely maintained thereon.

The width of the breaker structure should not exceed to any great extent the width of the surface of the casing unit against which the tread unit bears, and, in general, the smaller the angles formed by the threads or cords constituting the breaker unit with respect to the mid-circumferential plane of the tire, the smaller will be the most desirable breaker structure.

It is also important that the breaker structure should not extend transversely as far as the sides of the casing unit so as to allow the small longitudinal movements of the carcass cords which are typical of a radial carcass and which are necessary to avoid relative movement between the casing and the tread unit.

It will readily be seen therefore that the same tread can be employed for tires of equal size but adapted to support different loads.

What I claim as my invention and desire to secure by Letters Patent of the United States is:

1. A removable tread pneumatic tire comprising, in combination, a casing unit which is substantially inextensible transversely of the tire and relatively extensible in directions around the periphery of the tire, a removable separate tread unit positioned around said casing unit and having an outside tread layer, a cincture within said tread unit constituted by a reinforcing layer of helically wound metallic cord reinforcement having its coils substantially parallel to the plane of the tire, and at least one further layer of radially disposed reinforcing cords disposed within said tread unit radially outwardly and transverse with respect to the coils of the helical cord reinforcement.

2. A removable tread pneumatic tire comprising, in combination, a removable separate tread unit having an outer tread layer, a cincture formed of a helically disposed reinforcing metallic cord within said tread unit, at least one further layer of radially disposed reinforcing cords disposed in said cincture radially outwardly and transverse with respect to the coils of the reinforcing metallic cord, a casing unit supporting said tread unit and constrained within said cincture, and at least one layer of radially disposed reinforcing cords within said casing unit, allowing substantial extensibility of the casing unit in peripheral directions around the tire, but causing said casing unit to be substantially inextensible transversely of the tire.

3. A removable tread pneumatic tire comprising, in combination, a removable separate tread unit having an outer tread layer, a cincture formed of a helically disposed reinforcing metallic cord within said tread unit, at least one further layer of radially disposed reinforcing cords disposed in said cincture radially outwardly and transverse with respect to the coils of the reinforcing metallic cord, a casing unit supporting said tread unit and constrained within said cincture, and at least one layer of radially disposed reinforcing cords within said casing unit, allowing substantial extensibility of the casing unit in peripheral directions around the tire, but causing said casing unit to be substantially inextensible transversely of the tire, and a breaker structure within said casing unit disposed radially outwardly with respect to said radial reinforcing cords of said casing unit, said breaker structure being constituted by at least one pair of layers of reinforcing cords lying parallel to one another in each layer, the cords of the two layers being disposed in crossed directions relatively to each other and symmetrically with respect to the mid-circumferential plane of the tire, to which they lie at angles ranging between 40° and 80°, said breaker structure not extending as far as the sidewalls of the tire.

References Cited in the file of this patent

UNITED STATES PATENTS

| | | |
|---|---|---|
| 1,234,193 | Mass | July 24, 1917 |
| 2,498,859 | Lessig | Feb. 28, 1950 |
| 2,749,960 | Schwartz | June 12, 1956 |

FOREIGN PATENTS

| | | |
|---|---|---|
| 755,990 | Great Britain | Aug. 29, 1956 |

(Corresponding U.S. Patent No. 2,874,742, Feb. 24, 1959)